(12) United States Patent
Gerhart (10) Patent No.: US 10,228,866 B2
(45) Date of Patent: Mar. 12, 2019

(54) PERFORMANCE TUNING FOR STORAGE DEVICES

(71) Applicant: Western Digital Technologies, Inc., Irvine, CA (US)

(72) Inventor: Darin E. Gerhart, Oronoco, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 108 days.

(21) Appl. No.: 14/599,734

(22) Filed: Jan. 19, 2015

(65) Prior Publication Data

US 2016/0210074 A1 Jul. 21, 2016

(51) Int. Cl.
*G06F 3/06* (2006.01)

(52) U.S. Cl.
CPC .......... *G06F 3/0613* (2013.01); *G06F 3/061* (2013.01); *G06F 3/0611* (2013.01); *G06F 3/0632* (2013.01); *G06F 3/0634* (2013.01); *G06F 3/0659* (2013.01); *G06F 3/0688* (2013.01); *G06F 2212/261* (2013.01)

(58) Field of Classification Search
None
See application file for complete search history.

(56) References Cited

U.S. PATENT DOCUMENTS

| | | | |
|---|---|---|---|
| 5,333,154 A * | 7/1994 | Hengeveld | G01R 31/31928 327/217 |
| 5,890,014 A | 3/1999 | Long | |
| 6,704,159 B2 | 3/2004 | Ding et al. | |
| 7,739,470 B1 | 6/2010 | Norgren | |
| 2004/0103258 A1 * | 5/2004 | Blackmon | G06F 13/1689 711/167 |
| 2004/0123297 A1 * | 6/2004 | Flautner | G06F 1/3203 718/102 |
| 2005/0044334 A1 * | 2/2005 | Witter | G06F 3/14 711/167 |
| 2006/0004955 A1 * | 1/2006 | Ware | G11C 11/406 711/106 |
| 2010/0122021 A1 * | 5/2010 | Lee | G06F 3/0613 711/103 |

(Continued)

OTHER PUBLICATIONS

"ATTO Unitilities Installation and Operation Manual," ATTO Technology, Inc., Aug. 2005, 50 pp.

(Continued)

*Primary Examiner* — Jared I Rutz
*Assistant Examiner* — Stephanie Wu
(74) *Attorney, Agent, or Firm* — Patterson & Sheridan LLP; Steven Versteeg (57) ABSTRACT

In general, techniques are described for enabling performance tuning of a storage device. A storage device comprising one or more processors and a memory may perform the tuning techniques. The one or more processors may be configured to receive a command stream including one or more commands to access the storage device. The memory may be configured to store the command stream. The one or more processors may be further configured to insert a delay into the command stream to generate a performance tuned command stream, and access the storage device in accordance with the performance tuned command stream.

23 Claims, 8 Drawing Sheets

(56) References Cited

U.S. PATENT DOCUMENTS

| | | | | |
|---|---|---|---|---|
| 2011/0225445 A1* | 9/2011 | Gower | ................... | G06F 12/00 |
| | | | | 713/600 |
| 2012/0016533 A1* | 1/2012 | Lim | ....................... | G06F 1/206 |
| | | | | 700/300 |
| 2014/0189083 A1* | 7/2014 | Ho | ......................... | H04L 47/50 |
| | | | | 709/223 |

OTHER PUBLICATIONS

"Breaking the Speed Limits," Creative Planet Network, www.creativeplanetnetwork.com, Feb. 2012, 12 pp.

"Disk Drive Testing 101," SCSI Toolbox, LLC, 2011, 13 pp.

Lethe, "SmartMon User Manual," SANtools, Inc., Sep. 2005, 78 pp.

"SANtools S.M.A.R.T. Disk Monitor (SMARTMon-UX): Mode Page Editor," SANtools, retrieved from internet http://www.santools.com/smart/unix/manual/index.html?modepageeditor.htm, Oct. 2014, 2 pp.

"The SDParm Utility," retrieved from internet http://sg.danny.cz/sg/sdparm.html, May 2014, 24 pp.

* cited by examiner

PERFORMANCE TUNING FOR STORAGE DEVICES

TECHNICAL FIELD

This disclosure relates to performance tuning, and more particularly, to performance tuning for storage devices.

BACKGROUND

When deploying a large number of computing devices, a vendor may want to provide a uniform end-user experience. A uniform end-user experience may reduce return rates of the computing devices, reduce information technology (IT) inquiries, or otherwise reduce post-deployment costs associated with deploying the computing devices. The vendor commonly constructs these computing devices using a storage device, such as a solid state drive (SSD). The vendor may select SSDs from a variety of different manufacturers so as to potentially reduce supply chain constraints or otherwise protect against difficulties that may arise when sourcing SSDs from a single manufacturer.

The SSDs from different manufacturers may however vary greatly in terms of performance, thereby disrupting the goal of the vendor in providing a uniform end-user experience. As a result, the vendor may require that SSDs from different manufacturers vary in terms of performance by some set percentage. The percentage performance constraints on the SSDs may impact development of SSDs and increase manufacturing expenses and add delay as the manufacturer attempts to tune the performance of the SSDs to meet these performance constraints.

SUMMARY

In one example, a method comprises receiving, with a controller of a storage device, a command stream including one or more commands to access the storage device, inserting, with the controller, a delay into the command stream to generate a performance tuned command stream, and accessing, with the controller, the storage device in accordance with the performance tuned command stream.

In another example, a storage device comprises one or more processors configured to receive a command stream including one or more commands to access the storage device, and a memory configured to store the command stream. The one or more processors are further configured to insert a delay into the command stream to generate a performance tuned command stream, and access the storage device in accordance with the performance tuned command stream.

In another example, a non-transitory computer-readable storage medium has stored thereon instructions that, when executed, cause one or more processors of a storage device to receive a command stream including one or more commands to access the storage device, insert a delay into the command stream to generate a performance tuned command stream, and access the storage device in accordance with the performance tuned command stream.

The details of the one or more examples discussed above are set forth in the accompanying drawings and the description below. Other features, objects, and advantages will be apparent from the description and drawings, and from the claims.

DETAILED DESCRIPTION

In accordance with one or more techniques of this disclosure, a storage device may provide for granular performance tuning so as to facilitate vendors in ensuring a consistent end-user experience. The storage device may enable granular performing tuning in a number of different ways, all of which provide for insertion of delays into a standard conforming command stream (e.g., such as a small computer systems interface or SCSI command stream). The storage device may enable delay insertion as a configurable rate, and/or for a configurable delay length within the command stream. The storage device may enable delay insertion per specific types of command streams (where each type of command stream may be referred to herein as a different "command sub-stream"). Each command sub-stream may have one of the following types of commands: read verify, read, write, and write verify. The storage device may further enable delay insertion for particular types of target workloads, such as sequential workloads, near-sequential workloads, random workloads, or specific workloads defined by type of command, number of each type of command, pattern of each of type command, or any combination of the foregoing. The storage device may provide any combination of these different forms of performance tuning to allow vendors to match performance of the storage device with any other storage device from any other manufacturer.

In this respect, the techniques described in this disclosure may allow a storage device to provide granular performance tuning to ensure a consistent end-user experience. The storage device may provide for granular configuration of each of the read, read verify, write, and write verify performance, while also providing workload performance tuning for sequential, near-sequential and random workloads as well as custom workloads. By providing for such granular performance tuning, the techniques may allow vendors to easily achieve performance within the performance percentages. Moreover, the techniques may enable vendors, rather than manufacturers, to performance tune the storage device. By enabling vendors to performance tune storage devices in such a granular manner, the techniques may reduce manufacturer costs. Moreover, vendor performance tuning may reduce manufacturer delays in providing the storage devices as performance compliance may now be performed by the vendor.

Figure 1:
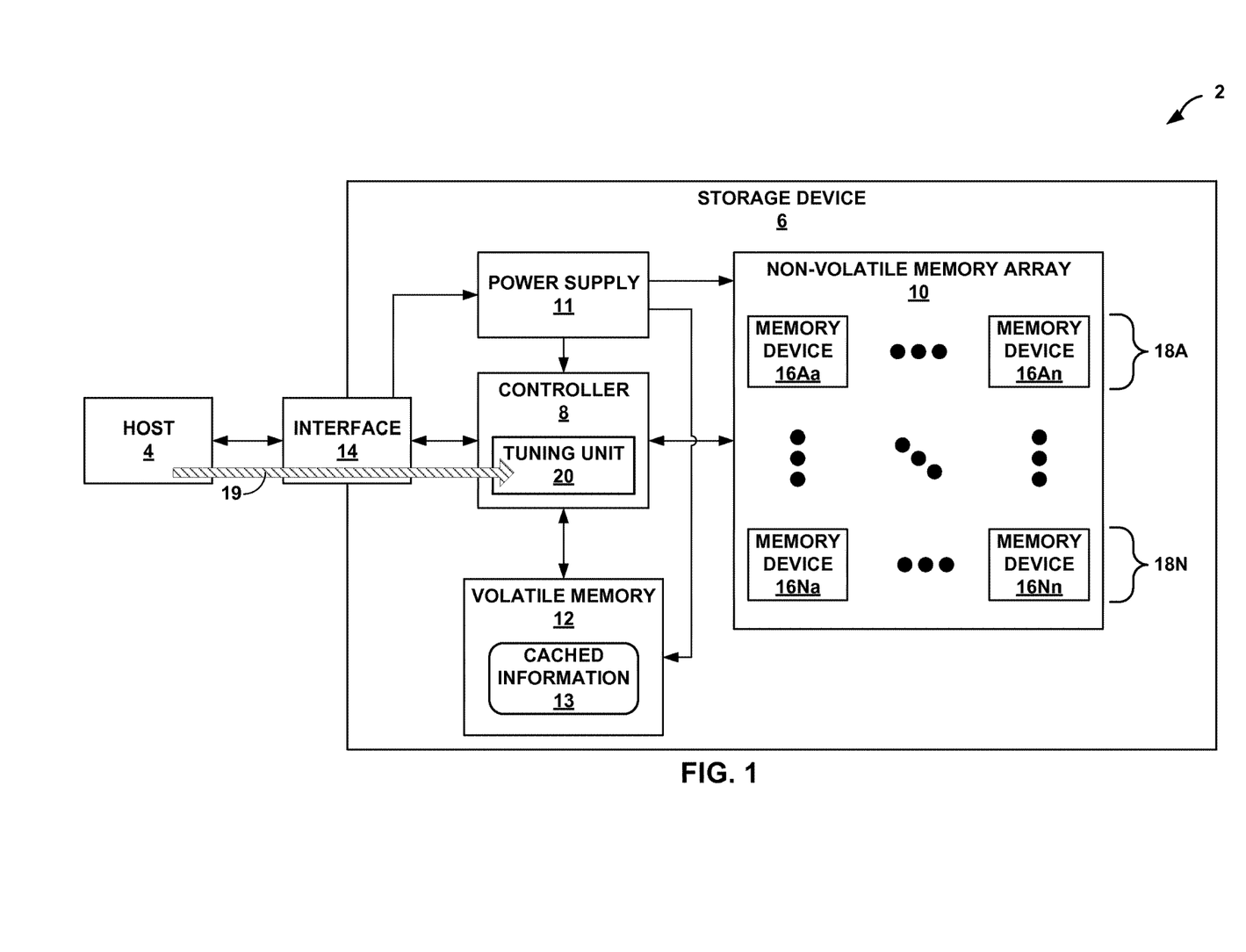
FIG. 1 is a conceptual and schematic block diagram illustrating an example storage environment in which a storage device may function as a storage device for a host device, in accordance with one or more techniques of this disclosure

FIG. 1 is a conceptual and schematic block diagram illustrating an example storage environment 2 in which storage device 6 may function as a storage device for host device 4, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, that may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1 storage device 6 may include controller 8, non-volatile memory array 10 (NVMA 10), power supply 11, volatile memory 12, and interface 14. In some examples, storage device 6 may include additional components not shown in FIG. 1 for the sake of clarity. For example, storage device 6 may include a printed board (PB) to which components of storage device 6 are mechanically attached and which includes electrically conductive traces that electrically interconnect components of storage device 6; and the like. In some examples, the physical dimensions and connector configurations of storage device 6 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe x1, x4, x8, x16, PCIe Mini Card, MiniPCI, etc.). In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA), and parallel-ATA (PATA)), Fibre Channel Arbitrated Loop (FCAL), small computer system interface (SCSI), serially attached SCSI (SAS), peripheral component interconnect (PCI), and PCI-express. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4. As illustrated in FIG. 1, power supply 11 may receive power from host device 4 via interface 14.

Storage device 6 may include NVMA 10 which may include a plurality of memory devices 16Aa-16Nn (collectively, "memory devices 16") which may each be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 6 may be referred to as a die. In some examples, a single physical chip may include a plurality of dies (i.e., a plurality of memory devices 16). In some examples, each of memory devices 16 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, memory devices 16 may include any type of non-volatile memory devices. Some examples, of memory devices 16 include, but are not limited to flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Controller 6 may write data to and read data from NAND flash memory devices at the page level and erase data from NAND flash memory devices at the block level.

In some examples, it may not be practical for controller 8 to be separately connected to each memory device of memory devices 16. As such, the connections between memory devices 16 and controller 8 may be multiplexed. As an example, memory devices 16 may be grouped into channels 18A-18N (collectively, "channels 18"). For instance, as illustrated in FIG. 1, memory devices 16Aa-16Nn may be grouped into first channel 18A, and memory devices 16Na-16Nn may be grouped into $N^{th}$ channel 18N. The memory devices 16 grouped into each of channels 18 may share one or more connections to controller 8. For instance, the memory devices 16 grouped into first channel 18A may be attached to a common I/O bus and a common control bus. Storage device 6 may include a common I/O bus and a common control bus for each respective channel of channels 18. In some examples, each channel of channels 18 may include a set of chip enable (CE) lines which may be used to multiplex memory devices on each channel. For example, each CE line may be connected to a respective memory device of memory devices 18. In this way, the number of separate connections between controller 8 and memory devices 18 may be reduced. Additionally, as each channel has an independent set of connections to controller 8, the reduction in connections may not significantly affect the data throughput rate as controller 8 may simultaneously issue different commands to each channel.

In some examples, storage device 6 may include a number of memory devices 16 selected to provide a total capacity that is greater than the capacity accessible to host device 4. This is referred to as over-provisioning. For example, if storage device 6 is advertised to include 240 GB of user-accessible storage capacity, storage device 6 may include sufficient memory devices 16 to give a total storage capacity of 256 GB. The 16 GB of storage devices 16 may not be accessible to host device 4 or a user of host device 4. Instead, the additional storage devices 16 may provide additional blocks to facilitate writes, garbage collection, wear leveling, and the like. Further, the additional storage devices 16 may provide additional blocks that may be used if some blocks wear to become unusable and are retired from use. The presence of the additional blocks may allow retiring of the worn blocks without causing a change in the storage capacity available to host device 4. In some examples, the amount of over-provisioning may be defined as p=(T−D)/D, wherein p is the over-provisioning ratio, T is the total storage capacity of storage device 2, and D is the storage capacity of storage device 2 that is accessible to host device 4.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Controller 8 may, in this respect, represent a unit configured to interface with host 4 and interface with non-volatile memory array 10. Controller 8 may receive commands in the form of a command stream from host 4. These commands may conform to a standard for accessing storage devices, such as SCSI. Controller 8 may process these commands, translating the commands into the above noted messages for accessing non-volatile memory array 10. These commands may correspond to different types, such as verify, read, write and write verify. Although typically referred to as a "verify" command in SCSI and other storage interfaces, the verify command may also be referred to as a "read verify command" to distinguish the "verify command" from and avoid confusion with the similarly named "write verify command."

The commands of the same type may be referred to herein as "command sub-streams." In other words, a command sub-stream may be referred to as a read verify command sub-stream, a read command sub-stream, a write command sub-stream and a write verify command sub-stream, each of which denotes a sub-stream having commands only of the designated type (i.e., read verify, read, write, or write verify in this example). The command stream may include commands of different types and controller 8 may identify these commands of different types and arrange them into the sub-streams through queuing or any of a number of other ways.

Although not shown in FIG. 1, controller 8 may include a host processor for interfacing with host 4 and a memory processor for interfacing with non-volatile memory array 10 (where this memory processor may also be referred to as a "NAND processor"). The host processor may comprise a general purpose processor, such as a central processing unit (CPU), or dedicated hardware, such as an application specific integrated circuit (ASIC). Likewise, the NAND processor may comprise a general purpose processor or dedicated hardware. It is assumed for purposes of illustration that the host processor represents a CPU that executes firmware and that the NAND processor is a dedicated hardware unit specifically configured to interface with non-volatile memory array 10. The techniques, however, are not limited to this specific example and should be understood to apply to any type of controller.

Given the wide variety of ways by which to implement storage devices (including controllers within storage devices), the performance of storage devices may vary greatly between manufacturers of storage devices. These performance differences may impact vendors of computing device that incorporate these storage devices. That is, when deploying a large number of computing devices, a vendor may want to provide a uniform end-user experience. A uniform end-user experience may reduce return rates of the computing devices, reduce information technology (IT) inquiries, or otherwise reduce post-deployment costs associated with deploying the computing devices. The vendor may select storage devices, such as SSDs, from a variety of different manufacturers so as to potentially reduce supply chain constraints or otherwise protect against difficulties that may arise when sourcing SSDs from a single manufacturer. This performance difference may therefore disrupt the goal of the vendor in providing a uniform end-user experience.

As a result, the vendor may require that SSDs from different manufacturers only vary in terms of performance by some set percentage. The percentage performance constraints on the SSDs may impact development of SSDs and increase manufacturing expenses and add delay as the manufacturer attempts to tune the performance of the SSDs to meet these performance constraints.

In accordance with one or more techniques of this disclosure, storage device 6 may provide for granular performance tuning so as to facilitate vendors in ensuring a consistent end-user experience. Storage device 6 may enable granular performing tuning in a number of different ways, all of which provide for insertion of delays into a standard conforming command stream (e.g., such as a small computer systems interface or SCSI command stream). Storage device 6 may enable delay insertion as a configurable rate, and/or for a configurable delay length within the command stream. The storage device may enable delay insertion per specific types of command streams (where each type of command stream may be referred to herein as a different "command sub-stream"). Each command sub-stream may have one of the following types of commands: read verify, read, write, and write verify. Storage device 6 may further enable delay insertion for particular types of target workloads, such as sequential workloads, near-sequential workloads, random workloads, or specific workloads defined by type of command, number of each type of command, pattern of each of type command, or any combination of the foregoing. Storage device 6 may provide any combination of these different forms of performance tuning to allow vendors to match performance of the storage device with any other storage device from any other manufacturer.

Controller 8 may include a tuning unit 20 configured to perform various aspect of the techniques described in this disclosure. Tuning unit 20 may, as one example, provide an interface with which a user, tuning system (e.g., a computer or provisioning system executing manufacturer provided performance tuning software) or other operator or device may interact to specify performance tuning configuration data. Via this interface, tuning unit 20 may receive this configuration data and thereby "tune" the insertion of delays into the command stream. Tuning unit 20 may, in some examples, represent a firmware module that the host processor of controller 8 executes when processing a command stream 19 received from host 4.

After obtaining this configuration data, tuning unit 20 begin analyzing command stream 19 to identify instances where delays are to be inserted in accordance with the configuration data. Tuning unit 20 may then insert these delays so as to generate a performance tuned command stream. Controller 8 and, more specifically, the NAND processor of controller 8 in this example may then access non-volatile memory array 10 in accordance with the performance tuned command stream.

In other words, controller 8 of storage device 6 may receive command stream 19 including one or more commands to access storage device 6. Controller 8 may then insert a delay into command stream 19 to generate a performance tuned command stream (which may, although not shown in the example of FIG. 1 be denoted as performance tuned command stream 19'). Controller 8 may then access the storage device in accordance with the performance tuned command stream.

In this respect, the techniques described in this disclosure may allow storage device 6 to provide granular performance tuning to ensure a consistent end-user experience. Storage device 6 may provide for granular configuration of each of the read, read verify, write, and write verify performance, while also providing workload performance tuning for sequential, near-sequential and random workloads as well as custom workloads. By providing for such granular performance tuning, the techniques may allow vendors to easily achieve performance within the performance percentages. Moreover, the techniques may enable vendors, rather than manufacturers, to performance tune storage device 6. By enabling vendors to performance tune storage devices in such a granular manner, the techniques may reduce manufacturer costs. Moreover, vendor performance tuning may reduce manufacturer delays in providing storage device 6 as performance compliance may now be performed by the vendor.

Figure 2:
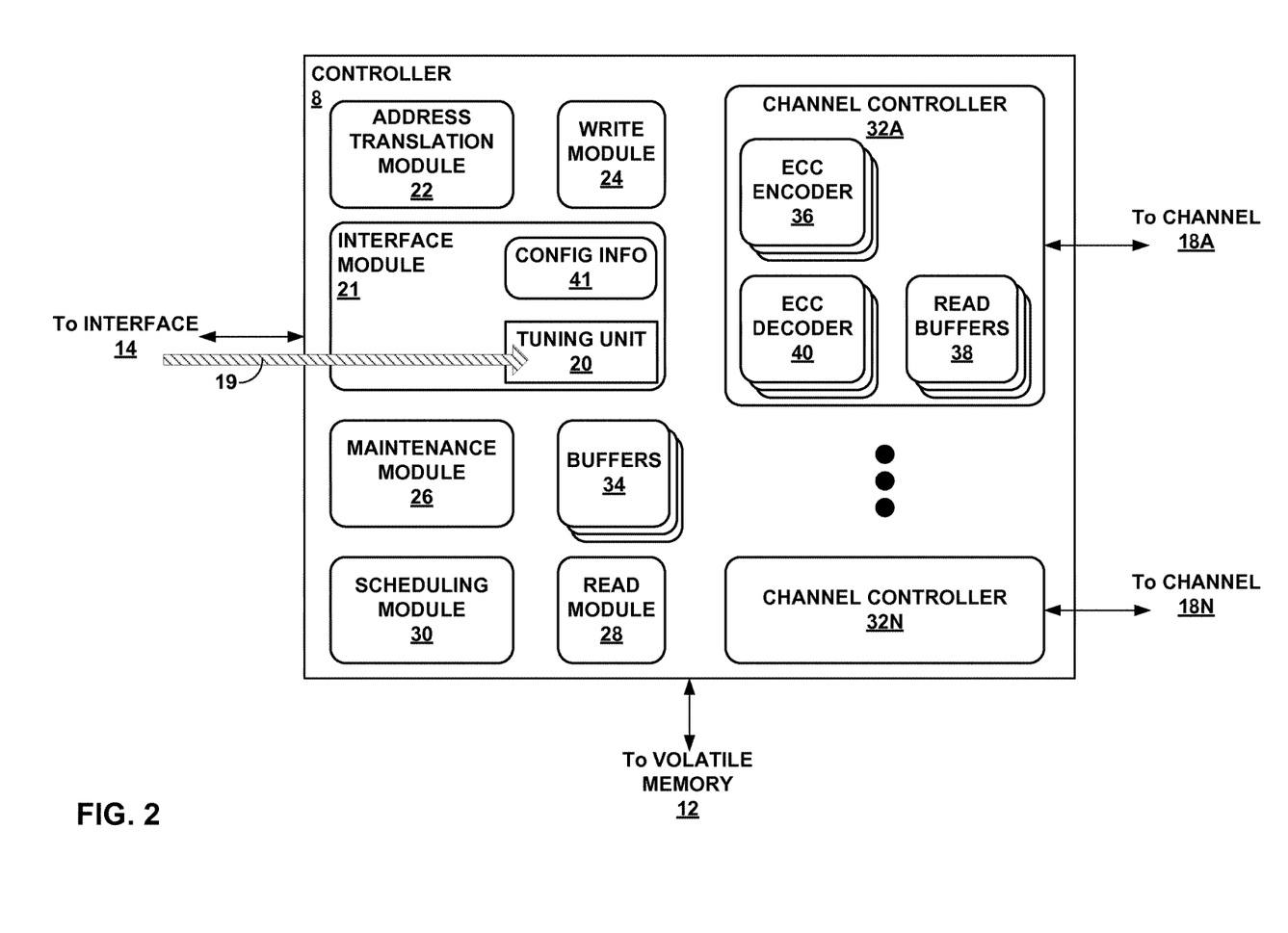
FIG. 2 is a conceptual and schematic block diagram illustrating an example controller, in accordance with one or more techniques of this disclosure.

FIG. 2 is a conceptual and schematic block diagram illustrating example details of controller 8. In some examples, controller 8 may include interface module 21, an address translation module 22, a write module 24, a maintenance module 26, a read module 28, a scheduling module 30, and a plurality of channel controllers 32A-32N (collectively, "channel controllers 32"). In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry. In some examples, controller 8 may be a system on a chip (SoC). Moreover, as noted above, controller 8 may represent one or more of the foregoing microprocessor, DSP, ASIC, FPGA, SOC or other processing controller logic in the form of a host processor and a NAND controller.

Controller 8 may interface with the host device 4 via interface 14. Interface module 21 may represent a module configured to manage the storage of data to and the retrieval of data from memory devices 16. Interface module 21 may queue commands forming command stream 19 and allocate commands to other modules, such as write module 24 and read module 28 via a dispatch queue.

Write module 24 of controller 8 may manage writes to memory devices 16. For example, write module 24 may receive a message from host device 4 via interface 14 instructing storage device 6 to store data associated with a logical address and the data. Write module 24 may manage writing of the data to memory devices 16. For example, write module 24 may communicate with address translation module 22, which manages translation between logical addresses used by host device 4 to manage storage locations of data and physical block addresses used by write module 24 to direct writing of data to memory devices.

Address translation module 22 of controller 8 may utilize a flash translation layer or table that translates logical addresses (or logical block addresses) of data stored by memory devices 16 to physical block addresses of data stored by memory devices 16. For example, host device 4 may utilize the logical block addresses of the data stored by memory devices 16 in instructions or messages to storage device 6, while write module 24 utilizes physical block addresses of the data to control writing of data to memory devices 16. (Similarly, read module 28 may utilize physical block addresses to control reading of data from memory devices 16.) The physical block addresses correspond to actual, physical blocks of memory devices 16. In some examples, address translation module 22 may store the flash translation layer or table in volatile memory 12, such as within cached information 13.

In this way, host device 4 may be allowed to use a static logical block address for a certain set of data, while the physical block address at which the data is actually stored may change. Address translation module 22 may maintain the flash translation layer or table to map the logical block addresses to physical block addresses to allow use of the static logical block address by the host device 4 while the physical block address of the data may change, e.g., due to wear leveling, garbage collection, or the like.

As discussed above, write module 24 of controller 8 may perform one or more operations to manage the writing of data to memory devices 16. For example, write module 24 may manage the writing of data to memory devices 16 by selecting one or more blocks within memory devices 16 to store the data and causing memory devices of memory devices 16 that include the selected blocks to actually store the data. As discussed above, write module 24 may cause address translation module 22 to update the flash translation layer or table based on the selected blocks. For instance, write module 24 may receive a message from host device 4 that includes a unit of data and a logical block address, select a block within a particular memory device of memory devices 16 to store the data, cause the particular memory device of memory devices 16 to actually store the data (e.g., via a channel controller of channel controllers 32 that corresponds to the particular memory device), and cause address translation module 22 to update the flash translation layer or table to indicate that the logical block address corresponds to the selected block within the particular memory device.

In some examples, after receiving the unit of data from host device 4, write module 24 may utilize volatile memory 12 to temporarily store the unit of data prior to causing one or more of memory devices 16 to actually store the data. In some examples, write module 24 may be configured to send host device 4 a message indicating whether the data was successfully stored. However, in some examples, write module 24 may send the message to host device 4 confirming successful storage of the data before the data is actually stored. For instance, write module 24 may send the message to host device 4 confirming successful storage of the data when the data is stored in volatile memory 12.

In some examples, in addition to causing the data to be stored by memory devices 16, write module 24 may cause memory devices 16 to store information which may be used to recover the unit of data should one or more of the blocks fail or become corrupted. The parity information may be used to recover the data stored by other blocks. In some examples, the parity information may be an XOR of the data stored by the other blocks.

In order to write a bit with a logical value of 0 (charged) to a bit with a previous logical value of 1 (uncharged), a large current is used. This current may be sufficiently large that it may cause inadvertent changes to the charge of adjacent flash memory cells. To protect against inadvertent changes, an entire block of flash memory cells may be erased to a logical value of 1 (uncharged) prior to writing any data to cells within the block. Because of this, flash memory cells may be erased at the block level and written at the page level.

Thus, to write even an amount of data that would consume less than one page, controller 8 may cause an entire block to be erased. This may lead to write amplification, which refers to the ratio between the amount of data received from host device 4 to be written to memory devices 16 and the amount of data actually written to memory devices 16. Write amplification contributes to faster wearing of the flash memory cells than would occur with no write amplification. Wear to flash memory cells may occur when flash memory cells are erased due to the relatively high voltages used to erase the flash memory cells. Over a plurality of erase cycles, the relatively high voltages may result in changes to the flash memory cells. Eventually, the flash memory cells may become unusable due to this wear where the flash memory cells may be unable to store data with sufficient accuracy to permit the data to be retrieved.

One process that controller 8 may implement to reduce write amplification and wear of flash memory cells includes writing data received from host device 4 to unused blocks or partially used blocks. For example, if host device 4 sends data to storage device 6 that includes only a small change from data already stored by storage device 6. The controller then may mark the old data as stale or no longer valid. Over time, this may reduce a number of erase operations blocks are exposed to, compared to erasing the block that holds the old data and writing the updated data to the same block.

Responsive to receiving a write command from host device 4, write module 24 may determine at which physical locations (e.g., blocks) of memory devices 16 to write the data. For example, write module 24 may request from address translation module 22 or maintenance module 26 one or more physical block addresses that are empty (e.g., store no data), partially empty (e.g., only some pages of the block store data), or store at least some invalid (or stale) data. Upon receiving the one or more physical block addresses, write module 24 may select one or more block as discussed above, and communicate a message that causes channel controllers 32A-32N (collectively, "channel controllers 32") to write the data to the selected blocks.

Read module 28 similarly may control reading of data from memory devices 16. For example, read module 28 may receive a message from host device 4 requesting data with an associated logical block address. Address translation module 22 may convert the logical block address to a physical block address using the flash translation layer or table. Read module 28 then may control one or more of channel controllers 32 to retrieve the data from the physical block addresses. Similar to write module 24, read module 28 may select one or more blocks and communicate a message to that causes channel controllers 32 to read the data from the selected blocks.

Each channel controller of channel controllers 32 may be connected to a respective channel of channels 18. In some examples, controller 8 may include the same number of channel controllers 32 as the number of channels 18 of storage device 2. Channel controllers 32 may perform the intimate control of addressing, programming, erasing, and reading of memory devices 16 connected to respective channels, e.g., under control of write module 24, read module 28, and/or maintenance module 26.

Maintenance module 26 may be configured to perform operations related to maintaining performance and extending the useful life of storage device 6 (e.g., memory devices 16). For example, maintenance module 26 may implement at least one of wear leveling or garbage collection.

As described above, erasing flash memory cells may use relatively high voltages, which, over a plurality of erase operations, may cause changes to the flash memory cells. After a certain number of erase operations, flash memory cells may degrade to the extent that data no longer may be written to the flash memory cells, and a block including those cells may be retired (no longer used by controller 8 to store data). To increase the amount of data that may be written to memory devices 16 before blocks are worn and retired, maintenance module 26 may implement wear leveling.

In wear leveling, maintenance module 26 may track a number of erases of or writes to a block or a group of blocks, for each block or group of blocks. Maintenance module 26 may cause incoming data from host device 4 to be written to a block or group of blocks that has undergone relatively fewer writes or erases, to attempt to maintain the number of writes or erases for each block or group of blocks approximately equal. This may cause each block of memory devices 16 to wear out at approximately the same rate, and may increase the useful lifetime of storage device 6.

Although this may reduce write amplification and wear of flash memory cells by reducing a number of erases and writing data to different blocks, this also may lead to blocks including some valid (fresh) data and some invalid (stale) data. To overcome this fresh data/stale data state, maintenance module 26 may implement garbage collection. In a garbage collection operation, maintenance module 26 may analyze the contents of the blocks of memory devices 16 to determine a block that contain a high percentage of invalid (stale) data. Maintenance module 26 then may rewrite the valid data from the block to a different block, and then erase the block. This may reduce an amount of invalid (stale) data stored by memory devices 16 and increase a number of free blocks, but also may increase write amplification and wear of memory devices 16.

Scheduling module 30 of controller 8 may perform one or more operations to schedule activities to be performed by memory devices 16. For instance, scheduling module 30 may schedule requests received from other components of controller 8 to command one or more of memory devices 16 to perform one or more activities during run-time. In some examples, scheduling module 30 may schedule the requests to be performed in the order in which they were received (e.g., first-in first-out or FIFO). In some examples, scheduling module 30 may schedule the requests based one or more factors which may include, but are not limited to, the type of request (e.g., a read request, a write request, an erase request, a garbage collection request, etc.), an amount of time elapsed since the request was received, an amount of power that would be consumed by performance of the request, bandwidth considerations, and the like.

In some examples, such as to comply with a power consumption budget, scheduling module 30 may schedule activities to be performed such that performance is throttled. For instance, where the power consumption budget allocates an amount of power to memory devices 16 that is less than an amount of power that would be consumed if all of memory devices 16 were concurrently active, scheduling module 30 may schedule activities to be performed such that the amount of power consumed by memory devices 16 does not exceed to amount of power allocated to memory devices 16.

As one example, where storage device 6 has a power consumption target of 25 W, the power consumption budget may allocate a portion of the power consumption target (e.g., 16 W) for use by memory devices 16. If the amount of power that would be consumed if all of memory devices 16 were concurrently active is greater than the allocated portion of the power consumption target (e.g., 16 W), scheduling module 30 may determine a quantity of memory devices 16 that may be currently active without consuming more power than the allocated portion. For instance, where memory devices 16 are allocated X units of a power consumption budget and each memory device of memory devices 16 consumed one unit of power when active, scheduling module 30 may determine that X memory devices of memory devices 16 may be concurrently active.

In some examples, scheduling module 30 may be configured to selectively enable the performance throttling. For instance, scheduling module 30 may enable throttling when operating in a first mode and disable throttling when operating in a second mode. In some examples, such as where throttling reduces the amount of memory devices 16 that may be concurrently active, the rate at which scheduling module 30 may cause data may be written to memory devices 16 may be lower in when throttling is enabled as compared to when throttling is disabled.

As further shown in the example of FIG. 2, controller 8 may include a number of buffers 34. Buffers 34 may be referred to as "raw data buffers 34" in some examples. Raw data buffers 34 may represent buffers used to store data that is to be passed to and/or received from channel controllers 32. Raw data buffers 34 may represent one of the resources noted above that may be requested by so-called requestors, such as write module 24 and read module 28.

Furthermore, although shown only with respect to channel controller 32A for ease of illustration purposes, each of channel controllers 32 may include a number of exemplary resources in the form of ECC encoders 36, read buffers 38 and ECC decoders 40 similar to that shown with respect to channel controller 32A. ECC encoders 36 may represent a unit or module configured to perform ECC encoding to data waiting to be written to non-volatile memory area 10. Read buffers 38 represent a unit or module configured to store data read from non-volatile memory area 10. Read buffers 38 may be configured to store read codewords. ECC decoders 40 may represent a unit or module configured to perform ECC decoding with respect to data stored to read buffers 38.

As also shown in the example of FIG. 2, interface module 21 may include tuning unit 20, which is configured to operate in accordance with the techniques described above. In other words, tuning unit 20 may provide a mechanism for vendors to adjust command delays for various command types prior to dispatching the command to the execution queue. Tuning unit 20 may provide for a vendor unique performance tuning parameter mode page by which to obtain configuration information 41 ("config info 41").

As one example, tuning unit 20 may include a workload detector that may potentially allow for specific delay descriptors based on workload type. In this respect, tuning unit 20 may provide sequential workload detection per command type and opportunity for vendors to define one, two or more customer unique workload detection mechanisms. An example of a customer workload detection mechanism, which may be specific to customer application, is indicating a workload detection that involves applying a delay to read command XX after receiving more than YY consecutive write commands (where XX and YY denote various numbers of commands, such as 6 and 100, respectively).

In this respect, tuning unit 20 may obtain configuration information 41 specifying a target workload type to which the insertion of the delay is to apply, e.g., via the vendor unique performance tuning parameter mode page. Tuning unit 20 may then analyze command stream 19 to determine a command stream workload type and, when the target workload type is the same as the command stream workload type, insert the delay into command stream 19. Moreover, as shown above by the foregoing example, the target workload type may be specified in terms of a type and a number of the one or more commands included in command stream 19, such as the XX number of read commands of type "read" and the YY number of write commands of type "write".

As another example, tuning unit 20 may provide a separate performance tuning workload descriptor array for each command type (e.g., read descriptor, write descriptor). Each of these different descriptors (which may represent one example of the configuration information described herein) may include, as shown in the below listed Tables 1-3, an overhead delay granularity selector, an overhead delay value, and an overhead delay command frequency. The overhead delay granularity selector may define units for overhead delay value (e.g., 0 and 1 and 12-15 being reserved for future use, 2=100 nanoseconds (ns), 3=1 microsecond (μs), 4=10 μs, . . . , 11=100 seconds (s)). The overhead delay value may define a value of the delay to be inserted during command receive (0=No delay, 1-15=number of overhead delay units to be inserted).

In this respect, tuning unit 20 may obtain configuration information 41 specifying a length of the delay that is to be inserted into command stream 19, e.g., again via the vendor unique performance tuning parameter mode page. Tuning unit 20 may then insert the delay of the length specified by configuration information 41 into the command stream. The configuration data may, as noted above, length of the delay in terms of a delay unit and a number of delay units.

The overhead delay command frequency may define how many commands of that command type to wait before inserting the overhead delay. The overhead delay command frequency may utilize a combination (or, in other words, addition) of the following two components:

Bits 0-3: denote a number of commands (and potentially only available when bits 4-7 specifying a gross adjustment is less than two)

Bits 4-7: denote a value for n used to compute a gross number of commands as a function of $2^n$ (e.g., 0=every command, 1=every $2^{nd}$ command, . . . , 15=32768 commands).

In this respect, tuning unit 20 may obtain configuration information 41 specifying a rate at which the delay is to be inserted into command stream 19, e.g., via the vendor unique performance tuning parameter mode page. Tuning unit 20 may then insert the delay into command stream 19 at the rate specified by configuration information 41.

Tuning unit 20 may provide that any combination of the rate, length and target workload by specified to enable granular performance tuning of storage device 6. As one example, tuning unit 20 may further allow for each array to be indexed by a workload index (WLI) so as to potentially provide more specific tuning options by specific workload for each descriptor type (e.g., read, write, read verification, and write verification). Tuning unit 20 may include a definition of, for example, four different workload types, such as a global workload, a sequential workload, and two custom workload definitions. WLI equal to zero indicates that a global workload is selected. When WLI 1-3 is configured for no delay (overhead delay value=0), tuning unit 20 may enforce this descriptor index. When tuning unit 21 performs the workload detection and does not detect that incoming command aligns with defined workload, tuning unit 21 applies the global workload scheme.

WLI equals 1 may indicate that a sequential workload override is enabled. In this sequential workload override mode, tuning unit 21 may, when the user programs non-zero values in this descriptor and command stream analysis identifies a sequential workload for this command type, use this sequential descriptor in place of the global workload descriptor (or, in other words, the sequential override descriptor overrides the global workload descriptor). WLI equals 2 and 3 may indicate a custom workload override descriptor is enabled. These custom workload override descriptors may allow for a vendor unique workload detection definitions to be provided per vendor (e.g., some near sequential definition, some mixed input/output (I/O) definition, or application of a delay only on read if it does not follow a write). These workloads can be unique for any vendor that already uses customized firmware. The foregoing may potentially unlock vendor capability to tune performance through trial and error to match desired behavior.

The foregoing example may be summarized by the following Tables 1-3:

TABLE 1

Vendor Unique Performance Tuning Parameter Mode Page.

| | | | | Bit | | | | |
|---|---|---|---|---|---|---|---|---|
| Byte | 7 | 6 | 5 | 4 | 3 | 2 | 1 | 0 |
| 0 | PS | SPF = 1 | Page Code = TBD (Vendor Unique Space) | | | | | |
| 1 | Subpage Code = TBD (Vendor Unique Space) | | | | | | | |
| 2-3 | Page Length = n-3 | | | | | | | |
| 4-n | Performance Tuning Workload Descriptor Array (Four Command Types initially defined for Read, Write, Verify, and Write Verify, but could be expanded) | | | | | | | |

TABLE 2

Performance Tuning Workload Descriptor Array

| | | | | Bit | | | |
|---|---|---|---|---|---|---|---|
| Byte | 7 | 6 | 5 | 4 | 3 | 2 | 1 |
| 0-1 | Performance Tuning Descriptor-Global Workload | | | | | | |
| 2-3 | Performance Tuning Descriptor-Sequential Workload | | | | | | |
| 4-5 | Performance Tuning Descriptor-Custom Workload 1 | | | | | | |
| 6-7 | Performance Tuning Descriptor-Custom Workload 2 | | | | | | |

TABLE 3

Performance Tuning Descriptor

| | | | | Bit | | | |
|---|---|---|---|---|---|---|---|
| Byte | 7 | 6 | 5 | 4 | 3 | 2 | 1 |
| 0 | Overhead Delay Granularity Selector | | | | Overhead Delay Value | | |
| 1 | Overhead Delay Command Frequency Gross Adjustment ($2^n$) | | | | Precise Adjustment | | |

FIGS. 3A-3E is a flowchart illustrating exemplary operation of a storage device in performing various aspects of the performing tuning techniques described in this disclosure. A controller 8 of a storage device 6 shown in the example of FIGS. 1 and 2 may represent one device capable of performing the techniques described in this disclosure. While described with respect to controller 8 of storage device 6 below, the techniques may be performed by any type of controller included within any type of storage device and should not be limited to the example described below.

Figure 3A:
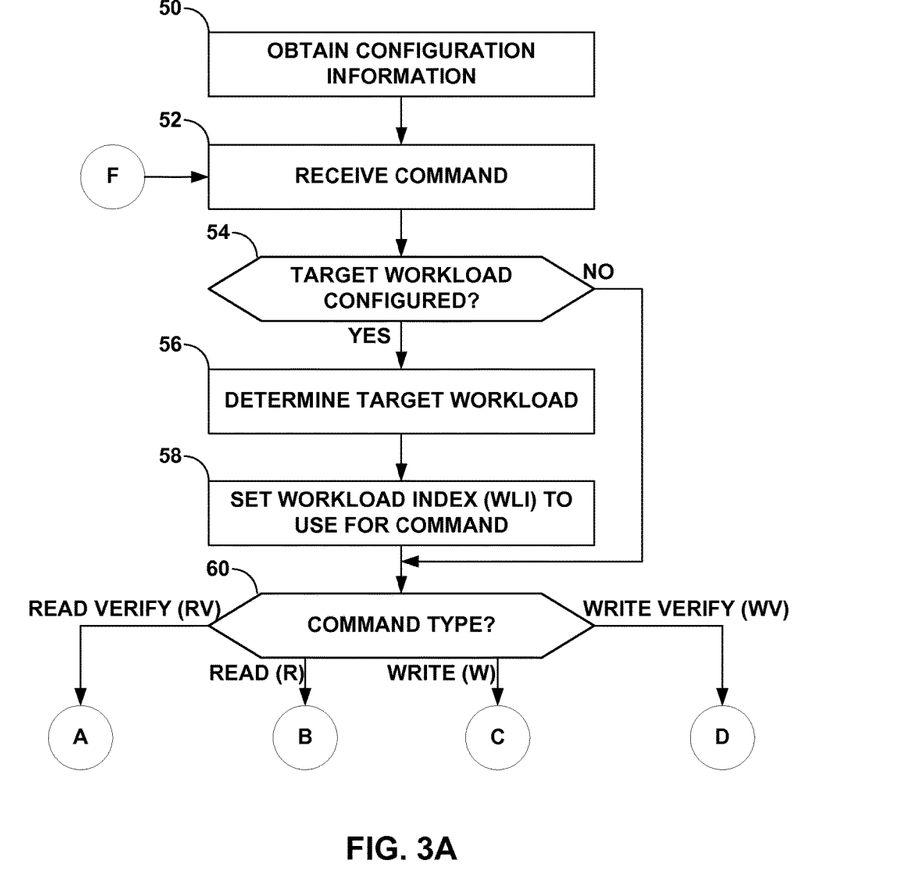
FIGS. 3A-3E is a flowchart illustrating exemplary operation of a storage device in performing various aspects of the performing tuning techniques described in this disclosure.

Referring first to FIG. 3A, tuning unit 20 of interface module 21 executed by controller 8 may obtain configuration information 41 as described above (50). Tuning unit 20 may then receive a command 19 (52). Tuning unit 20 may first determine, for command 19, whether a target workload has been configured based on configuration information 41 (54).

Although generally described as determining whether a target workload has been configured, tuning unit 20 may not in practice perform this determination. In other words, tuning unit 20 may come pre-configured with a default target workload and may determine whether an alternative target workload from the default target workload is to be used. The default target workload may, as one example, indicate that all of the descriptors are configured with zero delay. Moreover, in some examples, tuning unit 20 may only support one target workload, which may be pre-configured to the default target workload. Tuning unit 20 may support reconfiguration of the default target workload to provide for a customized target workload. Accessing the customized target workload may in effect represent tuning unit 20 determining whether a target workload is configured while accessing the default target workload may likewise in effect represent tuning unit 20 determining that the target workload is not configured.

In any event, when a target workload has been configured ("YES" 54), tuning unit 20 may determine the target workload based on configuration information 41 (56). Tuning unit 20 may next set the WLI to use for command 19 (58). Tuning unit 20 may next, after setting the WLI to use for command 19 or after determining that a target workload has not been configured ("NO" 54), determine the command type (read verify (RV), read (R), write (W) or write verify (WV)) for command 19 (60).

Figure 3B:
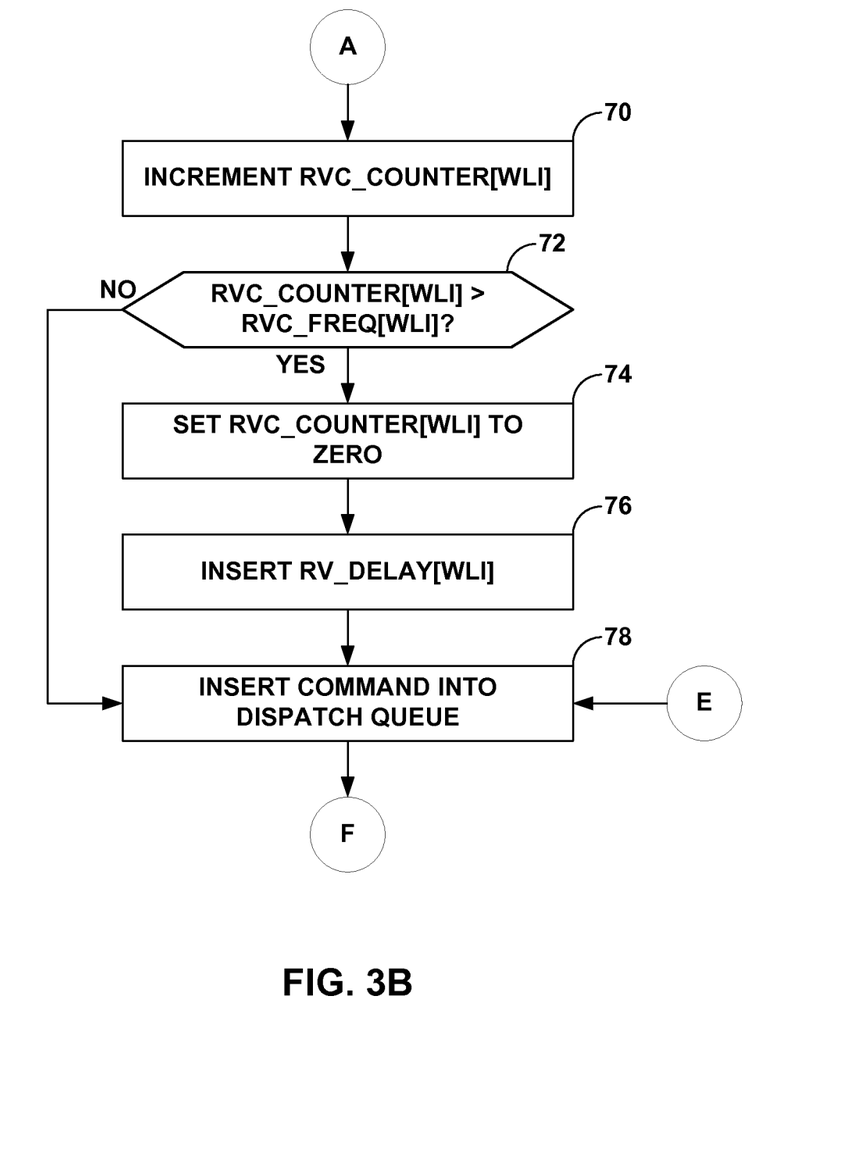
Figure 3C:
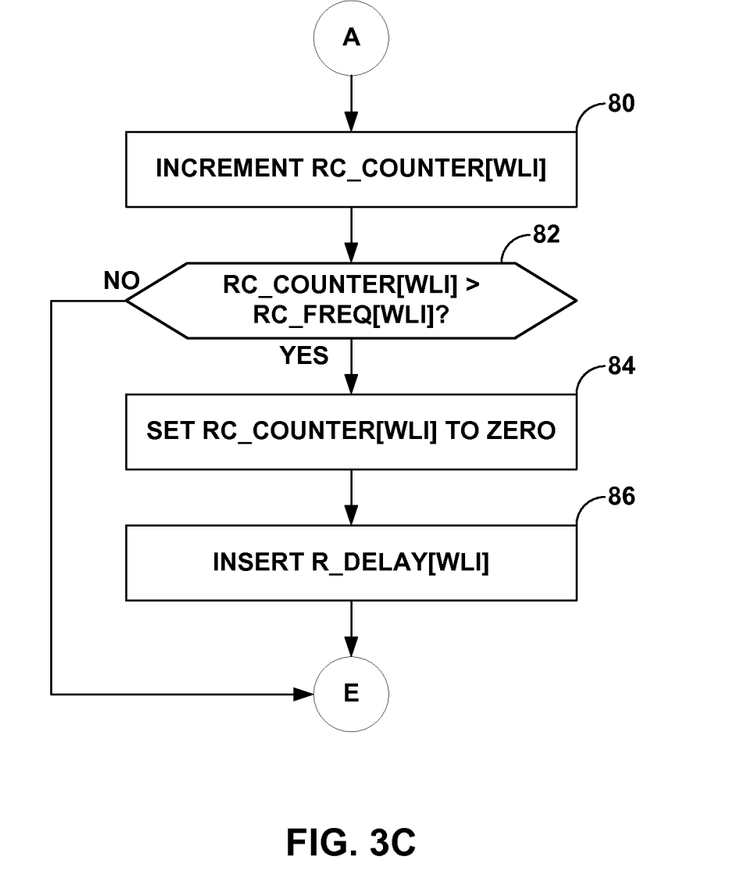
Figure 3D:
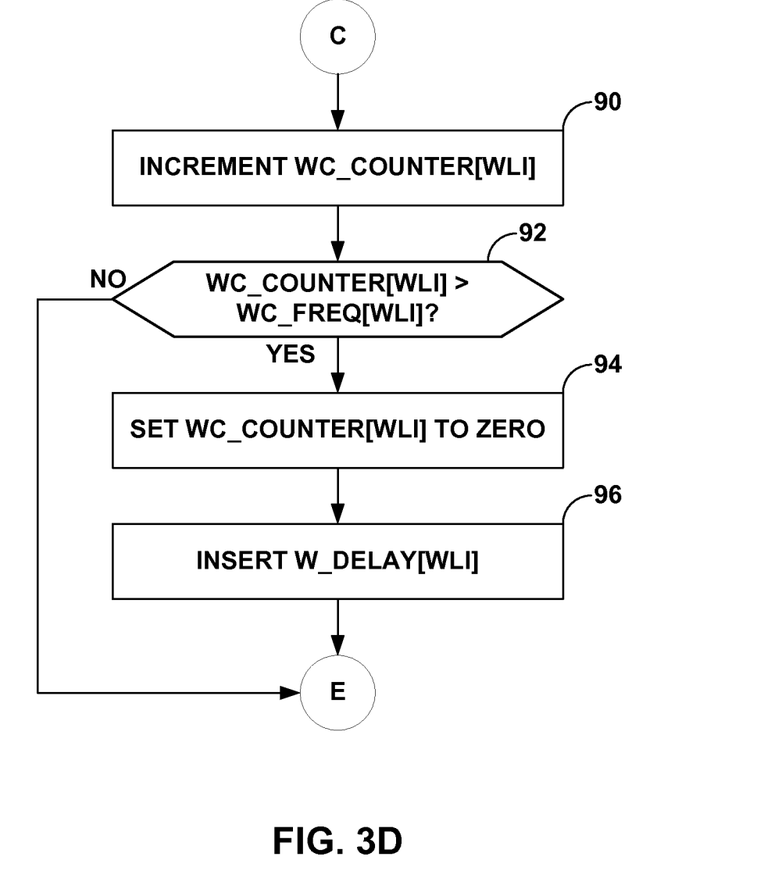
Figure 3E:
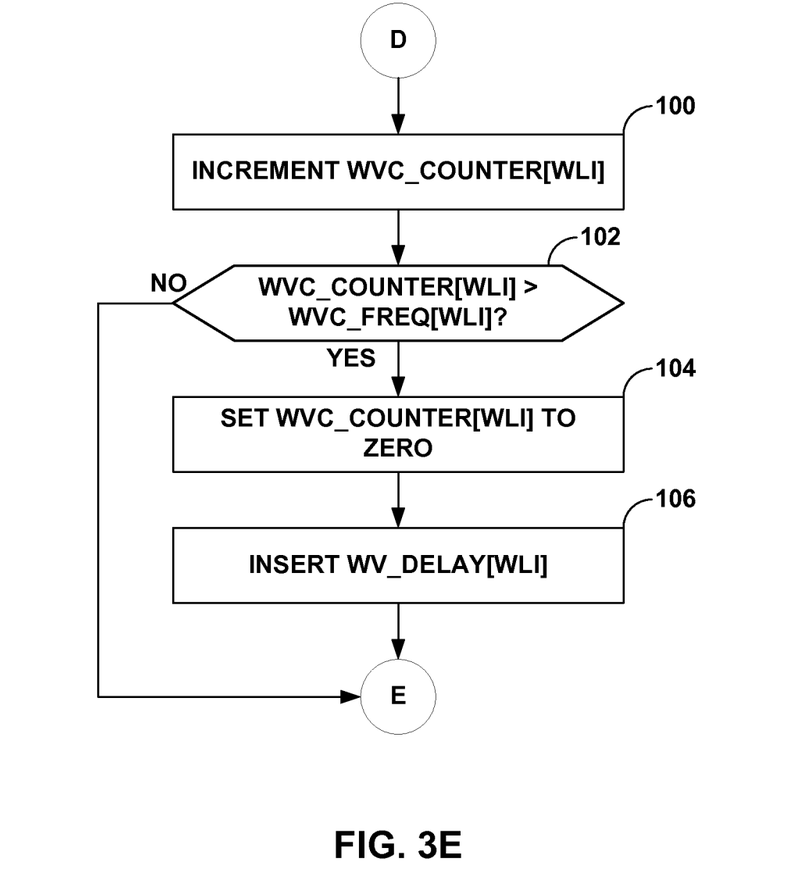

When the command type for command 19 is RV ("RV" 60), tuning unit 20 may, referring now to FIG. 3B, increment the RV command (RVC) counter (RVC_counter) for the corresponding WLI (RVC_counter[WLI]) by one (70). Tuning unit 20 may then compare the RVC_counter[WLI] to the RVC frequency ("freq") for the corresponding WLI (RVC_freq[WLI]), which represents a portion of configuration information 41 that identifies the rate at which the specified delay is to inserted into a portion of the command stream 19 (or, in other words, a command sub-stream) associated with RV type commands in the context of the specified target workload (WLI) (72). When RVC_counter[WLI] is greater than RVC_freq[WLI] ("YES" 72), tuning unit 20 sets RVC_counter[WLI] to zero (or, in other words, resets RVC_counter[WLI] to zero) and inserts the RV delay for the corresponding WLI (RV_delay[WLI]) by waiting the RV_delay[WLI] duration before inserting command 19 into the dispatch queue (74, 76). RV_delay[WLI] represent a portion of configuration information 41 that identifies the duration or length of the delay for the RV command type in the context of the specified target workload (WLI). When RVC_counter[WLI] is not greater than RVC_freq[WLI] ("NO" 72) or after inserting the RV_delay[WLI], tuning unit 20 may insert command 19 into the dispatch queue (78), whereupon it is sent to the appropriate module for processing.

When the command type for command 19 is R (FIG. 3A: "R" 60), tuning unit 20 may, referring now to FIG. 3C, increment the R command (RC) counter (RC_counter) for the corresponding WLI (RC_counter[WLI]) by one (80). Tuning unit 20 may then compare the RC_counter[WLI] to the RC frequency ("freq") for the corresponding WLI (RC_freq[WLI]), which represents a portion of configuration information 41 that identifies the rate at which the specified delay is to inserted into a portion of the command stream 19 (or, in other words, a command sub-stream) associated with R type commands in the context of the specified target workload (WLI) (82). When RC_counter[WLI] is greater than RC_freq[WLI] ("YES" 82), tuning unit 20 sets RC_counter[WLI] to zero (or, in other words, resets RC_counter[WLI] to zero) and inserts the R delay for the corresponding WLI (R_delay[WLI]) by waiting the R_delay[WLI] duration before inserting command 19 into the dispatch queue (84, 86). R_delay[WLI] represent a portion of configuration information 41 that identifies the duration or length of the delay for the R command type in the context of the specified target workload (WLI). When RC_counter[WLI] is not greater than RC_freq[WLI] ("NO" 82) or after inserting the R_delay[WLI], tuning unit 20 may insert command 19 into the dispatch queue (FIG. 3B: 78).

When the command type for command 19 is W (FIG. 3A: "W" 60), tuning unit 20 may, referring now to FIG. 3D, increment the W command (WC) counter (WC_counter) for the corresponding WLI (WC_counter[WLI]) by one (90). Tuning unit 20 may then compare the WC_counter[WLI] to the WC frequency ("freq") for the corresponding WLI (WC_freq[WLI]), which represents a portion of configuration information 41 that identifies the rate at which the specified delay is to inserted into a portion of the command stream 19 (or, in other words, a command sub-stream) associated with W type commands in the context of the specified target workload (WLI) (92). When WC_counter[WLI] is greater than WC_freq[WLI] ("YES" 92), tuning unit 20 sets WC_counter[WLI] to zero (or, in other words, resets WC_counter[WLI] to zero) and inserts the W delay for the corresponding WLI (W_delay[WLI]) by waiting the W_delay[WLI] duration before inserting command 19 into the dispatch queue (94, 96). W_delay[WLI] represent a portion of configuration information 41 that identifies the duration or length of the delay for the W command type in the context of the specified target workload (WLI). When WC_counter[WLI] is not greater than WC_freq[WLI] ("NO" 92) or after inserting the W_delay[WLI], tuning unit 20 may insert command 19 into the dispatch queue (FIG. 3B: 78).

When the command type for command 19 is WV (FIG. 3A: "WV" 60), tuning unit 20 may, referring now to FIG. 3E, increment the WV command (WVC) counter (WVC_counter) for the corresponding WLI (WVC_counter[WLI]) by one (100). Tuning unit 20 may then compare the WVC_counter[WLI] to the WVC frequency ("freq") for the corresponding WLI (WVC_freq[WLI]), which represents a portion of configuration information 41 that identifies the rate at which the specified delay is to inserted into a portion of the command stream 19 (or, in other words, a command sub-stream) associated with WV type commands in the context of the specified target workload (WLI) (102). When WVC_counter[WLI] is greater than WVC_freq[WLI] ("YES" 102), tuning unit 20 sets WVC_counter[WLI] to zero (or, in other words, resets WVC_counter[WLI] to zero) and inserts the WV delay for the corresponding WLI (WV_delay[WLI]) by waiting the WV_delay[WLI] duration before inserting command 19 into the dispatch queue (104, 106). WV_delay[WLI] represent a portion of configuration information 41 that identifies the duration or length of the delay for the WV command type in the context of the specified target workload (WLI). When WVC_counter[WLI] is not greater than WVC_freq[WLI] ("NO" 102) or after inserting the WV_delay[WLI], tuning unit 20 may insert command 19 into the dispatch queue (FIG. 3B: 78). After inserting command 19, tuning unit 20 may receive another command (FIG. 3A: 52) and continue to process the commands in the manner described above (54-106, 78, 52).

In this way, tuning unit 20 may effectively identify a first command sub-stream and a second command sub-stream, where the one or more commands includes a first command conforming to a first type of command for accessing the storage device and a second command conforming to a second type of command for accessing the storage device. Moreover, the first command sub-stream includes the first command and the second command sub-stream includes the second command. Tuning unit 20 may then obtain configuration information 41 specifying a first delay that is to be inserted with respect to the first command sub-stream and a second delay that is to be inserted with respect to the second command sub-stream. Tuning unit 20 may then insert the first delay into the first command sub-stream and the second delay into the second command sub-stream to generate the performance tuned command stream.

Figure 4:
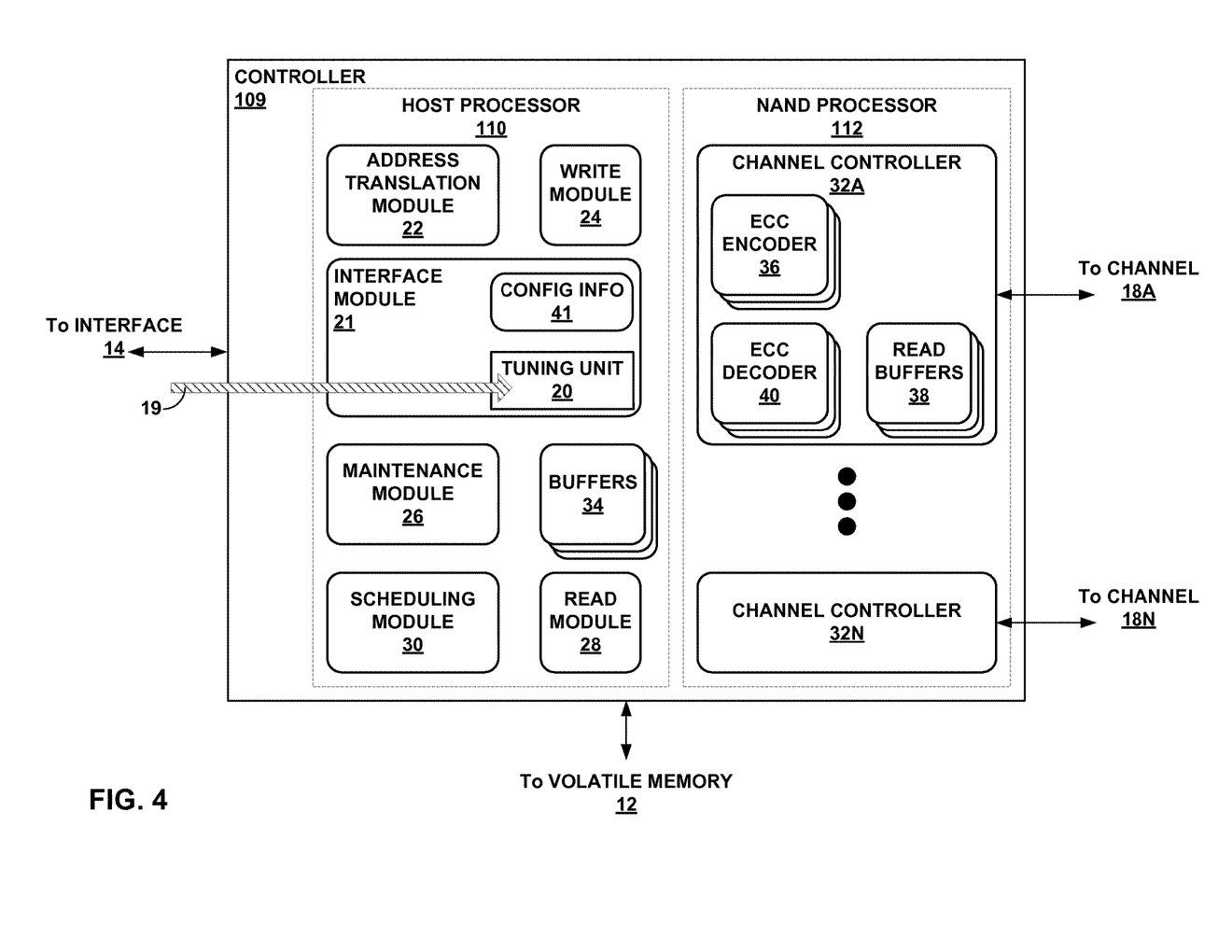
FIG. 4 is a conceptual and schematic block diagram illustrating another example controller, in accordance with one or more techniques of this disclosure.

FIG. 4 is conceptual and schematic block diagram illustrating another example of controller 109. Controller 109 may represent an alternative to control 8 to be used in place of controller 8 or may represent one way by which to implement controller 8 using a host processor 110 and a NAND processor 112. In other words, controller 109 may be substantially similar to controller 8, except that modules 21-30 are executed by host processor 110 (as firmware, for example), while NAND processor 112 may implement (in terms of hardware) channel controllers 32. Although shown in the example of FIG. 4 as executing and implementing particular ones of modules 21-32, the techniques may be implemented such that one or more of modules 21-30 are implemented by the NAND processor while modules 32 are executed by host processor 110. The techniques should not, therefore, be limited in this respect.

The techniques may provide for the following advantages. First, the techniques may provide performance control flexibility by, to provide a few examples, enabling independent controls for specific commands, providing a full range of performance variation options (10 ns granularity up to many seconds), and providing large control of frequency of performance variation. Moreover, the techniques may potentially provide dynamic adjustment based on workload. In other words, the techniques, by using a design that may adhere to typical SCSI mode page behavior, allow support for default, current and saved page settings and a defined power-on-reset (POR) and reset behavior. As a result, the techniques may allow for mode page setting that can be adjusted as the host detects workload variations. Furthermore, the techniques provide for a low impact integration in that the techniques allow for straight-forward design (given that vendors are generally familiar with using SCSI mode pages) that is easy to validate and test and minimal impact to underlying media system (hard disk drive (HDD) and SSD), while the mode page mechanism provides a quick way by which to tune and evaluate settings without need for special tools.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   receiving, with a controller of a non-volatile memory storage device, a command stream including commands to access the non-volatile memory storage device, wherein the commands include one or more read commands requesting data stored to the non-volatile memory storage device and one or more write commands requesting that data be written to the non-volatile memory storage device;
   inserting, with the controller, a delay into the command stream to generate a performance tuned command stream, wherein the delay is based upon a vendor parameter mode page setting unique to a vendor; and
   accessing, with the controller, the non-volatile memory storage device in accordance with the performance tuned command stream, wherein the performance tuned command stream throttles performance of the non-volatile memory storage device.

2. The method of claim 1, further comprising obtaining configuration information specifying a rate at which the delay is to be inserted into the command stream,
   wherein inserting the delay comprises inserting the delay into the command stream at the rate specified by the configuration information.

3. The method of claim 2, wherein the rate comprises a rate defined in terms of one or more of a gross adjustment and a fine adjustment, the fine adjustment defining a smaller adjustment in comparison to the gross adjustment.

4. The method of claim 1, further comprising obtaining configuration information specifying a length of the delay that is to be inserted into the command stream,
   wherein inserting the delay comprises inserting the delay of the length specified by the configuration information into the command stream.

5. The method of claim 4, wherein the configuration information specifies the length of the delay in terms of a delay unit and a number of delay units.

6. The method of claim 1, further comprising:
   obtaining configuration information specifying a target workload type to which the insertion of the delay is to apply;
   analyzing the command stream to determine a command stream workload type,
   wherein inserting the delay comprises, when the target workload type is the same as the command stream workload type, inserting the delay into the command stream.

7. The method of claim 6, wherein the target workload type is specified in terms of a type and a number of the one or more commands included in the command stream.

8. The method of claim 6, wherein the target workload type is either a sequential workload or a global workload.

9. The method of claim 1, wherein receiving the command stream comprises receiving the command stream in accordance with a standard storage device interface protocol.

10. The method of claim 9, wherein the standard storage device interface protocol comprises a small computer system interface (SCSI).

11. The method of claim 1,
    wherein the command stream comprises a first command sub-stream and a second command sub-stream,
    wherein the one or more commands includes a first command conforming to a first type of command for accessing the non-volatile memory storage device and a second command conforming to a second type of command for accessing the non-volatile memory storage device, wherein the first command sub-stream includes the first command and the second command sub-stream includes the second command, wherein the method further comprises obtaining configuration information specifying a first delay that is to be inserted with respect to the first command sub-stream and a second delay that is to be inserted with respect to the second command sub-stream, and wherein inserting the delay comprises inserting the first delay into the first command sub-stream and the second delay into the second command sub-stream to generate the performance tuned command stream.

12. A non-volatile memory storage device comprising:
one or more controllers configured to receive a command stream including commands to access the non-volatile memory storage device; and
a memory configured to store the command stream,
wherein the one or more controllers are further configured to insert a delay between two of the commands of the command stream to generate a performance tuned command stream in which the delay occurs between execution of the two of the commands, and access the non-volatile memory storage device in accordance with the performance tuned command stream, wherein the performance tuned command stream throttles performance of the non-volatile memory storage device, wherein the delay is based upon a vendor parameter mode page setting unique to a vendor.

13. The non-volatile memory storage device of claim 12, wherein the one or more controllers are further configured to obtain configuration information specifying a rate at which the delay is to be inserted into the command stream, and
wherein the one or more controllers are configured to insert the delay into the command stream at the rate specified by the configuration information.

14. The non-volatile memory storage device of claim 13, wherein the rate comprises a rate defined in terms of one or more of a gross adjustment and a fine adjustment, the fine adjustment defining a smaller adjustment in comparison to the gross adjustment.

15. The non-volatile memory storage device of claim 12, wherein the one or more controllers are further configured to obtain configuration information specifying a length of the delay that is to be inserted into the command stream, and
wherein the one or more controllers are configured to insert the delay of the length specified by the configuration information into the command stream.

16. The non-volatile memory storage device of claim 15, wherein the configuration information specifies the length of the delay in terms of a delay unit and a number of delay units.

17. The non-volatile memory storage device of claim 12, wherein the one or more controllers are further configured to obtain configuration information specifying a target workload type to which the insertion of the delay is to apply, analyze the command stream to determine a command stream workload type, and wherein the one or more controllers are configured to, when the target workload type is the same as the command stream workload type, insert the delay into the command stream.

18. The non-volatile memory storage device of claim 17, wherein the target workload type is specified in terms of a type and a number of the one or more commands included in the command stream.

19. The non-volatile memory storage device of claim 17, wherein the target workload type is either a sequential workload or a global workload.

20. The non-volatile memory storage device of claim 12, wherein the one or more controllers are further configured to receive the command stream in accordance with a standard storage device interface protocol.

21. The non-volatile memory storage device of claim 20, wherein the standard storage device interface protocol comprises a small computer system interface (SCSI).

22. The non-volatile memory storage device of claim 12, wherein the command stream comprises a first command sub-stream and a second command sub-stream,
wherein the one or more commands includes a first command conforming to a first type of command for accessing the non-volatile memory storage device and a second command conforming to a second type of command for accessing the storage device,
wherein the first command sub-stream includes the first command and the second command sub-stream includes the second command,
wherein the one or more controllers are further configured to obtain configuration information specifying a first delay that is to be inserted with respect to the first command sub-stream and a second delay that is to be inserted with respect to the second command sub-stream, and
wherein the one or more controllers are configured to insert the first delay into the first command sub-stream and the second delay into the second command sub-stream to generate the performance tuned command stream.

23. A non-transitory computer-readable storage medium having stored thereon instructions that, when executed, cause one or more controllers of a non-volatile memory storage device to:
receive a command stream including commands to access the storage device;
insert a delay into the command stream to generate a performance tuned command stream, wherein the performance tuned command stream throttles performance of the non-volatile memory storage device, wherein the delay is based upon a vendor parameter mode page setting unique to a vendor;
execute a first command of the performance tuned command stream to access the storage device; and
execute, after performing the delay, a second command of the performance tuned command stream to access the storage device.

* * * * *